United States Patent
Lepore et al.

(10) Patent No.: US 10,728,361 B2
(45) Date of Patent: Jul. 28, 2020

(54) SYSTEM FOR ASSOCIATION OF CUSTOMER INFORMATION ACROSS SUBSCRIBERS

(71) Applicant: Cisco Technology, Inc., San Jose, CA (US)

(72) Inventors: Michael P. Lepore, Marlborough, MA (US); Stephen R. Quatrano, Lexington, MA (US); Tod Lloyd Famous, Ayer, MA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 235 days.

(21) Appl. No.: 15/992,048

(22) Filed: May 29, 2018

(65) Prior Publication Data
US 2019/0373077 A1    Dec. 5, 2019

(51) Int. Cl.
H04L 29/08    (2006.01)
H04L 29/06    (2006.01)

(52) U.S. Cl.
CPC ............ *H04L 67/306* (2013.01); *H04L 63/12* (2013.01); *H04L 67/12* (2013.01)

(58) Field of Classification Search
CPC ....... H04L 67/306; H04L 67/12; H04L 63/12; H04L 63/083; H04L 9/0863; G06F 17/30; G06F 21/6218; G06F 21/6272; G06F 2221/2103
See application file for complete search history.

(56) References Cited

U.S. PATENT DOCUMENTS

| | | | |
|---|---|---|---|
| 5,812,773 A | 9/1998 | Norin | |
| 5,889,896 A | 3/1999 | Meshinsky et al. | |
| 6,108,782 A | 8/2000 | Fletcher et al. | |
| 6,178,453 B1 | 1/2001 | Mattaway et al. | |
| 6,298,153 B1 | 10/2001 | Oishi | |
| 6,343,290 B1 | 1/2002 | Cossins et al. | |
| 6,643,260 B1 | 11/2003 | Kloth et al. | |
| 6,683,873 B1 | 1/2004 | Kwok et al. | |
| 6,721,804 B1 | 4/2004 | Rubin et al. | |

(Continued)

FOREIGN PATENT DOCUMENTS

| | | |
|---|---|---|
| CN | 101719930 | 6/2010 |
| CN | 101394360 | 7/2011 |

(Continued)

OTHER PUBLICATIONS

Amedro, Brian, et al., "An Efficient Framework for Running Applications on Clusters, Grids and Cloud," 2010, 17 pages.

(Continued)

*Primary Examiner* — Todd L Barker
(74) *Attorney, Agent, or Firm* — Polsinelli PC

(57) ABSTRACT

The disclosed technology relates to a context service system configured to receive, from a subscriber, a shared customer lookup request that includes a first customer data identifier and identify, in a shared data partition, a second customer data identifier associated with the first customer data identifier. The context service system is further configured to determine that the second customer data identifier is associated with customer information in a subscriber data partition and transmit, to the subscriber system, the customer information from the subscriber data partition.

16 Claims, 7 Drawing Sheets

(56) References Cited

U.S. PATENT DOCUMENTS

| | | |
|---|---|---|
| 6,733,449 B1 | 5/2004 | Krishnamurthy et al. |
| 6,735,631 B1 | 5/2004 | Oehrke et al. |
| 6,996,615 B1 | 2/2006 | McGuire |
| 7,054,930 B1 | 5/2006 | Cheriton |
| 7,058,706 B1 | 6/2006 | Lyer et al. |
| 7,062,571 B1 | 6/2006 | Dale et al. |
| 7,111,177 B1 | 9/2006 | Chauvel et al. |
| 7,212,490 B1 | 5/2007 | Kao et al. |
| 7,277,948 B2 | 10/2007 | Igarashi et al. |
| 7,313,667 B1 | 12/2007 | Pullela et al. |
| 7,379,846 B1 | 5/2008 | Williams et al. |
| 7,480,672 B2 | 1/2009 | Hahn et al. |
| 7,496,043 B1 | 2/2009 | Leong et al. |
| 7,536,476 B1 | 5/2009 | Alleyne |
| 7,567,504 B2 | 7/2009 | Darling et al. |
| 7,583,665 B1 | 9/2009 | Duncan et al. |
| 7,606,147 B2 | 10/2009 | Luft et al. |
| 7,624,421 B2 * | 11/2009 | Ozzie ............... H04L 63/08 709/201 |
| 7,644,437 B2 | 1/2010 | Volpano |
| 7,647,594 B2 | 1/2010 | Togawa |
| 7,773,510 B2 | 8/2010 | Back et al. |
| 7,808,897 B1 | 10/2010 | Mehta et al. |
| 7,881,957 B1 | 2/2011 | Cohen et al. |
| 7,917,647 B2 | 3/2011 | Cooper et al. |
| 7,930,252 B2 | 4/2011 | Bender et al. |
| 8,010,598 B2 | 8/2011 | Tanimoto |
| 8,028,071 B1 | 9/2011 | Mahalingam et al. |
| 8,041,714 B2 | 10/2011 | Aymeloglu et al. |
| 8,121,117 B1 | 2/2012 | Amdahl et al. |
| 8,140,502 B2 | 3/2012 | Francis et al. |
| 8,171,415 B2 | 5/2012 | Appleyard et al. |
| 8,234,377 B2 | 7/2012 | Cohn |
| 8,244,559 B2 | 8/2012 | Horvitz et al. |
| 8,250,215 B2 | 8/2012 | Stienhans et al. |
| 8,280,880 B1 | 10/2012 | Aymeloglu et al. |
| 8,284,664 B1 | 10/2012 | Aybay et al. |
| 8,301,746 B2 | 10/2012 | Head et al. |
| 8,345,692 B2 | 1/2013 | Smith |
| 8,406,141 B1 | 3/2013 | Couturier et al. |
| 8,407,205 B2 * | 3/2013 | Doshi ............... G06F 16/27 707/710 |
| 8,407,413 B1 | 3/2013 | Yucel et al. |
| 8,448,171 B2 | 5/2013 | Donnellan et al. |
| 8,477,610 B2 | 7/2013 | Zuo et al. |
| 8,495,356 B2 | 7/2013 | Ashok et al. |
| 8,495,725 B2 | 7/2013 | Ahn |
| 8,510,469 B2 | 8/2013 | Portolani |
| 8,514,868 B2 | 8/2013 | Hill |
| 8,532,108 B2 | 9/2013 | Li et al. |
| 8,533,687 B1 | 9/2013 | Greifeneder et al. |
| 8,547,974 B1 | 10/2013 | Guruswamy et al. |
| 8,560,639 B2 | 10/2013 | Murphy et al. |
| 8,560,663 B2 | 10/2013 | Baucke et al. |
| 8,589,543 B2 | 11/2013 | Dutta et al. |
| 8,590,050 B2 | 11/2013 | Nagpal et al. |
| 8,611,356 B2 | 12/2013 | Yu et al. |
| 8,612,625 B2 | 12/2013 | Andreis et al. |
| 8,630,291 B2 | 1/2014 | Shaffer et al. |
| 8,639,787 B2 | 1/2014 | Lagergren et al. |
| 8,656,024 B2 | 2/2014 | Krishnan et al. |
| 8,660,129 B1 | 2/2014 | Brendel et al. |
| 8,719,804 B2 | 5/2014 | Jain |
| 8,775,576 B2 | 7/2014 | Hebert et al. |
| 8,797,867 B1 | 8/2014 | Chen et al. |
| 8,805,951 B1 | 8/2014 | Faibish et al. |
| 8,838,629 B2 | 9/2014 | Degeoglu et al. |
| 8,850,002 B1 | 9/2014 | Dickinson et al. |
| 8,850,182 B1 | 9/2014 | Fritz et al. |
| 8,856,339 B2 | 10/2014 | Mestery et al. |
| 8,909,928 B2 | 12/2014 | Ahmad et al. |
| 8,918,510 B2 | 12/2014 | Gmach et al. |
| 8,924,720 B2 | 12/2014 | Raghuram et al. |
| 8,930,747 B2 | 1/2015 | Levijarvi et al. |
| 8,938,775 B1 | 1/2015 | Roth et al. |
| 8,959,526 B2 | 2/2015 | Kansal et al. |
| 8,977,754 B2 | 3/2015 | Curry, Jr. et al. |
| 9,009,697 B2 | 4/2015 | Breiter et al. |
| 9,015,324 B2 | 4/2015 | Jackson |
| 9,043,439 B2 | 5/2015 | Bicket et al. |
| 9,049,115 B2 | 6/2015 | Rajendran et al. |
| 9,063,789 B2 | 6/2015 | Beaty et al. |
| 9,065,727 B1 | 6/2015 | Liu et al. |
| 9,075,649 B1 | 7/2015 | Bushman et al. |
| 9,130,846 B1 | 9/2015 | Szabo et al. |
| 9,164,795 B1 | 10/2015 | Vincent |
| 9,167,050 B2 | 10/2015 | Durazzo et al. |
| 9,201,701 B2 | 12/2015 | Boldyrev et al. |
| 9,201,704 B2 | 12/2015 | Chang et al. |
| 9,203,784 B2 | 12/2015 | Chang et al. |
| 9,223,634 B2 | 12/2015 | Chang et al. |
| 9,244,776 B2 | 1/2016 | Koza et al. |
| 9,251,114 B1 | 2/2016 | Ancin et al. |
| 9,264,478 B2 | 2/2016 | Hon et al. |
| 9,294,408 B1 | 3/2016 | Dickinson et al. |
| 9,313,048 B2 | 4/2016 | Chang et al. |
| 9,361,192 B2 | 6/2016 | Smith et al. |
| 9,379,982 B1 | 6/2016 | Krishna et al. |
| 9,380,075 B2 | 6/2016 | He et al. |
| 9,432,245 B1 | 8/2016 | Sorenson, III et al. |
| 9,432,294 B1 | 8/2016 | Sharma et al. |
| 9,444,744 B1 | 9/2016 | Sharma et al. |
| 9,473,365 B2 | 10/2016 | Melander et al. |
| 9,485,271 B1 * | 11/2016 | Roundy ............... H04L 63/1441 |
| 9,503,530 B1 | 11/2016 | Niedzielski |
| 9,558,078 B2 | 1/2017 | Farlee et al. |
| 9,571,570 B1 | 2/2017 | Mutnuru |
| 9,613,078 B2 | 4/2017 | Vermeulen et al. |
| 9,628,471 B1 | 4/2017 | Sundaram et al. |
| 9,658,876 B2 | 5/2017 | Chang et al. |
| 9,692,802 B2 | 6/2017 | Bicket et al. |
| 9,755,858 B2 | 9/2017 | Bagepalli et al. |
| 2001/0055303 A1 | 12/2001 | Horton et al. |
| 2002/0073337 A1 | 6/2002 | Ioele et al. |
| 2002/0143928 A1 | 10/2002 | Maltz et al. |
| 2002/0166117 A1 | 11/2002 | Abrams et al. |
| 2002/0174216 A1 | 11/2002 | Shorey et al. |
| 2003/0018591 A1 | 1/2003 | Komisky |
| 2003/0056001 A1 | 3/2003 | Mate et al. |
| 2003/0228585 A1 | 12/2003 | Inoko et al. |
| 2004/0004941 A1 | 1/2004 | Malan et al. |
| 2004/0034702 A1 | 2/2004 | He |
| 2004/0088542 A1 | 5/2004 | Daude et al. |
| 2004/0095237 A1 | 5/2004 | Chen et al. |
| 2004/0131059 A1 | 7/2004 | Ayyakad et al. |
| 2004/0197079 A1 | 10/2004 | Latvala et al. |
| 2004/0264481 A1 | 12/2004 | Darling et al. |
| 2005/0060418 A1 | 3/2005 | Sorokopud |
| 2005/0125424 A1 | 6/2005 | Herriott et al. |
| 2006/0062187 A1 | 3/2006 | Rune |
| 2006/0104286 A1 | 5/2006 | Cheriton |
| 2006/0126665 A1 | 6/2006 | Ward et al. |
| 2006/0146825 A1 | 7/2006 | Hofstaedter et al. |
| 2006/0155875 A1 | 7/2006 | Cheriton |
| 2006/0168338 A1 | 7/2006 | Bruegl et al. |
| 2006/0233106 A1 | 10/2006 | Achlioptas et al. |
| 2007/0174663 A1 | 7/2007 | Crawford et al. |
| 2007/0223487 A1 | 9/2007 | Kajekar et al. |
| 2007/0242830 A1 | 10/2007 | Conrado et al. |
| 2008/0005293 A1 | 1/2008 | Bhargava et al. |
| 2008/0080524 A1 | 4/2008 | Tsushima et al. |
| 2008/0084880 A1 | 4/2008 | Dharwadkar |
| 2008/0165778 A1 | 7/2008 | Ertemalp |
| 2008/0198752 A1 | 8/2008 | Fan et al. |
| 2008/0198858 A1 | 8/2008 | Townsley et al. |
| 2008/0201711 A1 | 8/2008 | Amir Husain |
| 2008/0235755 A1 | 9/2008 | Blaisdell et al. |
| 2009/0006527 A1 | 1/2009 | Gingell, Jr. et al. |
| 2009/0019367 A1 | 1/2009 | Cavagnari et al. |
| 2009/0031312 A1 | 1/2009 | Mausolf et al. |
| 2009/0083183 A1 | 3/2009 | Rao et al. |
| 2009/0138763 A1 | 5/2009 | Arnold |
| 2009/0177775 A1 | 7/2009 | Radia et al. |
| 2009/0178058 A1 | 7/2009 | Stillwell, III et al. |

(56) References Cited

U.S. PATENT DOCUMENTS

| | | |
|---|---|---|
| 2009/0182874 A1 | 7/2009 | Morford et al. |
| 2009/0265468 A1 | 10/2009 | Annambhotla et al. |
| 2009/0265753 A1 | 10/2009 | Anderson et al. |
| 2009/0293056 A1 | 11/2009 | Ferris |
| 2009/0300608 A1 | 12/2009 | Ferris et al. |
| 2009/0313562 A1 | 12/2009 | Appleyard et al. |
| 2009/0323706 A1 | 12/2009 | Germain et al. |
| 2009/0328031 A1 | 12/2009 | Pouyadou et al. |
| 2010/0036903 A1 | 2/2010 | Ahmad et al. |
| 2010/0042720 A1 | 2/2010 | Stienhans et al. |
| 2010/0061250 A1 | 3/2010 | Nugent |
| 2010/0115341 A1 | 5/2010 | Baker et al. |
| 2010/0131765 A1 | 5/2010 | Bromley et al. |
| 2010/0149966 A1 | 6/2010 | Achlioptas et al. |
| 2010/0191783 A1 | 7/2010 | Mason et al. |
| 2010/0192157 A1 | 7/2010 | Jackson et al. |
| 2010/0205601 A1 | 8/2010 | Abbas et al. |
| 2010/0211782 A1 | 8/2010 | Auradkar et al. |
| 2010/0293270 A1 | 11/2010 | Augenstein et al. |
| 2010/0318609 A1 | 12/2010 | Lahiri et al. |
| 2010/0325199 A1 | 12/2010 | Park et al. |
| 2010/0325441 A1 | 12/2010 | Laurie et al. |
| 2010/0333116 A1 | 12/2010 | Prahlad et al. |
| 2011/0016214 A1 | 1/2011 | Jackson |
| 2011/0035754 A1 | 2/2011 | Srinivasan |
| 2011/0055396 A1 | 3/2011 | Dehaan |
| 2011/0055398 A1 | 3/2011 | Dehaan et al. |
| 2011/0055470 A1 | 3/2011 | Portolani |
| 2011/0072489 A1 | 3/2011 | Parann-Nissany |
| 2011/0075667 A1 | 3/2011 | Li et al. |
| 2011/0110382 A1 | 5/2011 | Jabr et al. |
| 2011/0116443 A1 | 5/2011 | Yu et al. |
| 2011/0126099 A1 | 5/2011 | Anderson et al. |
| 2011/0138055 A1 | 6/2011 | Daly et al. |
| 2011/0145413 A1 | 6/2011 | Dawson et al. |
| 2011/0145657 A1 | 6/2011 | Bishop et al. |
| 2011/0173303 A1 | 7/2011 | Rider |
| 2011/0185063 A1 | 7/2011 | Head et al. |
| 2011/0185065 A1 | 7/2011 | Stanisic et al. |
| 2011/0206052 A1 | 8/2011 | Tan et al. |
| 2011/0213966 A1 | 9/2011 | Fu et al. |
| 2011/0219434 A1 | 9/2011 | Betz et al. |
| 2011/0231715 A1 | 9/2011 | Kunii et al. |
| 2011/0231899 A1 | 9/2011 | Pulier et al. |
| 2011/0239039 A1 | 9/2011 | Dieffenbach et al. |
| 2011/0252327 A1 | 10/2011 | Awasthi et al. |
| 2011/0261811 A1 | 10/2011 | Battestilli et al. |
| 2011/0261828 A1 | 10/2011 | Smith |
| 2011/0276675 A1 | 11/2011 | Singh et al. |
| 2011/0276951 A1 | 11/2011 | Jain |
| 2011/0283013 A1 | 11/2011 | Grosser et al. |
| 2011/0295998 A1 | 12/2011 | Ferris et al. |
| 2011/0305149 A1 | 12/2011 | Scott et al. |
| 2011/0307531 A1 | 12/2011 | Gaponenko et al. |
| 2011/0320870 A1 | 12/2011 | Kenigsberg et al. |
| 2012/0005724 A1 | 1/2012 | Lee |
| 2012/0036234 A1 | 2/2012 | Staats et al. |
| 2012/0054367 A1 | 3/2012 | Ramakrishnan et al. |
| 2012/0072318 A1 | 3/2012 | Akiyama et al. |
| 2012/0072578 A1 | 3/2012 | Alam |
| 2012/0072581 A1 | 3/2012 | Tung et al. |
| 2012/0072985 A1 | 3/2012 | Davne et al. |
| 2012/0072992 A1 | 3/2012 | Arasaratnam et al. |
| 2012/0084445 A1 | 4/2012 | Brock et al. |
| 2012/0084782 A1 | 4/2012 | Chou et al. |
| 2012/0096134 A1 | 4/2012 | Suit |
| 2012/0102193 A1 | 4/2012 | Rathore et al. |
| 2012/0102199 A1 | 4/2012 | Hopmann et al. |
| 2012/0131174 A1 | 5/2012 | Ferris et al. |
| 2012/0137215 A1 | 5/2012 | Kawara |
| 2012/0158967 A1 | 6/2012 | Sedayao et al. |
| 2012/0159097 A1 | 6/2012 | Jennas, II et al. |
| 2012/0167094 A1 | 6/2012 | Suit |
| 2012/0173710 A1 | 7/2012 | Rodriguez |
| 2012/0179909 A1 | 7/2012 | Sagi et al. |
| 2012/0180044 A1 | 7/2012 | Donnellan et al. |
| 2012/0182891 A1 | 7/2012 | Lee et al. |
| 2012/0185913 A1 | 7/2012 | Martinez et al. |
| 2012/0192016 A1 | 7/2012 | Gotesdyner et al. |
| 2012/0192075 A1 | 7/2012 | Ebtekar et al. |
| 2012/0201135 A1 | 8/2012 | Ding et al. |
| 2012/0214506 A1 | 8/2012 | Skaaksrud et al. |
| 2012/0222106 A1 | 8/2012 | Kuehl |
| 2012/0236716 A1 | 9/2012 | Anbazhagan et al. |
| 2012/0240113 A1 | 9/2012 | Hur |
| 2012/0265976 A1 | 10/2012 | Spiers et al. |
| 2012/0272025 A1 | 10/2012 | Park et al. |
| 2012/0281706 A1 | 11/2012 | Agarwal et al. |
| 2012/0281708 A1 | 11/2012 | Chauhan et al. |
| 2012/0290647 A1 | 11/2012 | Ellison et al. |
| 2012/0297238 A1 | 11/2012 | Watson et al. |
| 2012/0311106 A1 | 12/2012 | Morgan |
| 2012/0311568 A1 | 12/2012 | Jansen |
| 2012/0324092 A1 | 12/2012 | Brown et al. |
| 2012/0324114 A1 | 12/2012 | Dutta et al. |
| 2013/0003567 A1 | 1/2013 | Gallant et al. |
| 2013/0013248 A1 | 1/2013 | Brugler et al. |
| 2013/0036213 A1 | 2/2013 | Hasan et al. |
| 2013/0044636 A1 | 2/2013 | Koponen et al. |
| 2013/0066940 A1 | 3/2013 | Shao |
| 2013/0080509 A1 | 3/2013 | Wang |
| 2013/0080624 A1 | 3/2013 | Nagai et al. |
| 2013/0091557 A1 | 4/2013 | Gurrapu |
| 2013/0097601 A1 | 4/2013 | Podvratnik et al. |
| 2013/0104140 A1 | 4/2013 | Meng et al. |
| 2013/0111540 A1 | 5/2013 | Sabin |
| 2013/0117337 A1 | 5/2013 | Dunham |
| 2013/0124712 A1 | 5/2013 | Parker |
| 2013/0125124 A1 | 5/2013 | Kempf et al. |
| 2013/0138816 A1 | 5/2013 | Kuo et al. |
| 2013/0144978 A1 | 6/2013 | Jain et al. |
| 2013/0152076 A1 | 6/2013 | Patel |
| 2013/0152175 A1 | 6/2013 | Hromoko et al. |
| 2013/0159097 A1 | 6/2013 | Schory et al. |
| 2013/0159496 A1 | 6/2013 | Hamilton et al. |
| 2013/0160008 A1 | 6/2013 | Cawlfield et al. |
| 2013/0162753 A1 | 6/2013 | Hendrickson et al. |
| 2013/0169666 A1 | 7/2013 | Pacheco et al. |
| 2013/0179941 A1 | 7/2013 | McGloin et al. |
| 2013/0182712 A1 | 7/2013 | Aguayo et al. |
| 2013/0185433 A1 | 7/2013 | Zhu et al. |
| 2013/0191106 A1 | 7/2013 | Kephart et al. |
| 2013/0198374 A1 | 8/2013 | Zalmanovitch et al. |
| 2013/0201989 A1 | 8/2013 | Hu et al. |
| 2013/0204849 A1 | 8/2013 | Chacko |
| 2013/0232491 A1 | 9/2013 | Radhakrishnan et al. |
| 2013/0246588 A1 | 9/2013 | Borowicz et al. |
| 2013/0250770 A1 | 9/2013 | Zou et al. |
| 2013/0254415 A1 | 9/2013 | Fullen et al. |
| 2013/0262347 A1 | 10/2013 | Dodson |
| 2013/0283364 A1 | 10/2013 | Chang et al. |
| 2013/0297769 A1 | 11/2013 | Chang et al. |
| 2013/0318240 A1 | 11/2013 | Hebert et al. |
| 2013/0318546 A1 | 11/2013 | Kothuri et al. |
| 2013/0339949 A1 | 12/2013 | Spiers et al. |
| 2014/0006481 A1 | 1/2014 | Frey et al. |
| 2014/0006535 A1 | 1/2014 | Reddy |
| 2014/0006585 A1 | 1/2014 | Dunbar et al. |
| 2014/0040473 A1 | 2/2014 | Ho et al. |
| 2014/0040883 A1 | 2/2014 | Tompkins |
| 2014/0052877 A1 | 2/2014 | Mao |
| 2014/0056146 A1 | 2/2014 | Hu et al. |
| 2014/0059310 A1 | 2/2014 | Du et al. |
| 2014/0074850 A1 | 3/2014 | Noel et al. |
| 2014/0075048 A1 | 3/2014 | Yuksel et al. |
| 2014/0075108 A1 | 3/2014 | Dong et al. |
| 2014/0075357 A1 | 3/2014 | Flores et al. |
| 2014/0075501 A1 | 3/2014 | Srinivasan et al. |
| 2014/0089727 A1 | 3/2014 | Cherkasova et al. |
| 2014/0098762 A1 | 4/2014 | Ghai et al. |
| 2014/0108985 A1 | 4/2014 | Scott et al. |
| 2014/0122560 A1 | 5/2014 | Ramey et al. |
| 2014/0136779 A1 | 5/2014 | Guha et al. |
| 2014/0140211 A1 | 5/2014 | Chandrasekaran et al. |

(56) References Cited

U.S. PATENT DOCUMENTS

| | | |
|---|---|---|
| 2014/0141720 A1 | 5/2014 | Princen et al. |
| 2014/0156557 A1 | 6/2014 | Zeng et al. |
| 2014/0164486 A1 | 6/2014 | Ravichandran et al. |
| 2014/0188825 A1 | 7/2014 | Muthukkaruppan et al. |
| 2014/0189095 A1 | 7/2014 | Lindberg et al. |
| 2014/0189125 A1 | 7/2014 | Amies et al. |
| 2014/0215471 A1 | 7/2014 | Cherkasova |
| 2014/0222953 A1 | 8/2014 | Karve et al. |
| 2014/0244851 A1 | 8/2014 | Lee |
| 2014/0245298 A1 | 8/2014 | Zhou et al. |
| 2014/0281173 A1 | 9/2014 | Im et al. |
| 2014/0282536 A1 | 9/2014 | Dave et al. |
| 2014/0282611 A1 | 9/2014 | Campbell et al. |
| 2014/0282889 A1 | 9/2014 | Ishaya et al. |
| 2014/0289200 A1 | 9/2014 | Kato |
| 2014/0295831 A1 | 10/2014 | Karra et al. |
| 2014/0297569 A1 | 10/2014 | Clark et al. |
| 2014/0297835 A1 | 10/2014 | Buys |
| 2014/0310391 A1 | 10/2014 | Sorenson, III et al. |
| 2014/0310417 A1 | 10/2014 | Sorenson, III et al. |
| 2014/0310418 A1 | 10/2014 | Sorenson, III et al. |
| 2014/0314078 A1 | 10/2014 | Jilani |
| 2014/0317261 A1 | 10/2014 | Shatzkamer et al. |
| 2014/0321278 A1 | 10/2014 | Cafarelli et al. |
| 2014/0330976 A1 | 11/2014 | van Bemmel |
| 2014/0330977 A1 | 11/2014 | van Bemmel |
| 2014/0334488 A1 | 11/2014 | Guichard et al. |
| 2014/0362682 A1 | 12/2014 | Guichard et al. |
| 2014/0365680 A1 | 12/2014 | van Bemmel |
| 2014/0366155 A1 | 12/2014 | Chang et al. |
| 2014/0369204 A1 | 12/2014 | Anand et al. |
| 2014/0372567 A1 | 12/2014 | Ganesh et al. |
| 2014/0379938 A1 | 12/2014 | Bosch et al. |
| 2015/0033086 A1 | 1/2015 | Sasturkar et al. |
| 2015/0043576 A1 | 2/2015 | Dixon et al. |
| 2015/0052247 A1 | 2/2015 | Threefoot et al. |
| 2015/0052517 A1 | 2/2015 | Raghu et al. |
| 2015/0058382 A1 | 2/2015 | St Laurent et al. |
| 2015/0058459 A1 | 2/2015 | Amendjian et al. |
| 2015/0071285 A1 | 3/2015 | Kumar et al. |
| 2015/0085870 A1 | 3/2015 | Narasimha et al. |
| 2015/0089082 A1 | 3/2015 | Patwardhan et al. |
| 2015/0100471 A1 | 4/2015 | Curry, Jr. et al. |
| 2015/0103827 A1 | 4/2015 | Quinn et al. |
| 2015/0106802 A1 | 4/2015 | Ivanov et al. |
| 2015/0106805 A1 | 4/2015 | Melander et al. |
| 2015/0117199 A1 | 4/2015 | Chinnaiah Sankaran et al. |
| 2015/0117458 A1 | 4/2015 | Gurkan et al. |
| 2015/0120914 A1 | 4/2015 | Wada et al. |
| 2015/0124622 A1 | 5/2015 | Kovvali et al. |
| 2015/0138973 A1 | 5/2015 | Kumar et al. |
| 2015/0178133 A1 | 6/2015 | Phelan et al. |
| 2015/0189009 A1 | 7/2015 | van Bemmel |
| 2015/0215819 A1 | 7/2015 | Bosch et al. |
| 2015/0227405 A1 | 8/2015 | Jan et al. |
| 2015/0242204 A1 | 8/2015 | Hassine et al. |
| 2015/0249709 A1 | 9/2015 | Teng et al. |
| 2015/0263901 A1 | 9/2015 | Kumar et al. |
| 2015/0280980 A1 | 10/2015 | Bitar |
| 2015/0281067 A1 | 10/2015 | Wu |
| 2015/0281113 A1 | 10/2015 | Siciliano et al. |
| 2015/0304315 A1* | 10/2015 | Estehghari ............ G06F 16/284 713/156 |
| 2015/0309908 A1 | 10/2015 | Pearson et al. |
| 2015/0319063 A1 | 11/2015 | Zourzouvillys et al. |
| 2015/0326524 A1 | 11/2015 | Tankala et al. |
| 2015/0339210 A1 | 11/2015 | Kopp et al. |
| 2015/0358850 A1 | 12/2015 | La Roche, Jr. et al. |
| 2015/0365324 A1 | 12/2015 | Kumar et al. |
| 2015/0373108 A1 | 12/2015 | Fleming et al. |
| 2016/0011925 A1 | 1/2016 | Kulkarni et al. |
| 2016/0013990 A1 | 1/2016 | Kulkarni et al. |
| 2016/0026684 A1 | 1/2016 | Mukherjee et al. |
| 2016/0062786 A1 | 3/2016 | Meng et al. |
| 2016/0094389 A1 | 3/2016 | Jain et al. |
| 2016/0094398 A1 | 3/2016 | Choudhury et al. |
| 2016/0094453 A1 | 3/2016 | Jain et al. |
| 2016/0094454 A1 | 3/2016 | Jain et al. |
| 2016/0094455 A1 | 3/2016 | Jain et al. |
| 2016/0094456 A1 | 3/2016 | Jain et al. |
| 2016/0094480 A1 | 3/2016 | Kulkarni et al. |
| 2016/0094643 A1 | 3/2016 | Jain et al. |
| 2016/0099847 A1 | 4/2016 | Melander et al. |
| 2016/0099853 A1 | 4/2016 | Nedeltchev et al. |
| 2016/0099864 A1 | 4/2016 | Akiya et al. |
| 2016/0105393 A1 | 4/2016 | Thakkar et al. |
| 2016/0127184 A1 | 5/2016 | Bursell |
| 2016/0134557 A1 | 5/2016 | Steinder et al. |
| 2016/0156708 A1 | 6/2016 | Jalan et al. |
| 2016/0164780 A1 | 6/2016 | Timmons et al. |
| 2016/0164914 A1 | 6/2016 | Madhav et al. |
| 2016/0182378 A1 | 6/2016 | Basavaraja et al. |
| 2016/0188527 A1 | 6/2016 | Cherian et al. |
| 2016/0234071 A1 | 8/2016 | Nambiar et al. |
| 2016/0239399 A1 | 8/2016 | Babu et al. |
| 2016/0253078 A1 | 9/2016 | Ebtekar et al. |
| 2016/0254968 A1 | 9/2016 | Ebtekar et al. |
| 2016/0261564 A1 | 9/2016 | Foxhoven et al. |
| 2016/0277368 A1 | 9/2016 | Narayanaswamy et al. |
| 2017/0005948 A1 | 1/2017 | Melander et al. |
| 2017/0024260 A1 | 1/2017 | Chandrasekaran et al. |
| 2017/0026294 A1 | 1/2017 | Basavaraja et al. |
| 2017/0026470 A1 | 1/2017 | Bhargava et al. |
| 2017/0041342 A1 | 2/2017 | Efremov et al. |
| 2017/0054659 A1 | 2/2017 | Ergin et al. |
| 2017/0097841 A1 | 4/2017 | Chang et al. |
| 2017/0099188 A1 | 4/2017 | Chang et al. |
| 2017/0104755 A1 | 4/2017 | Arregoces et al. |
| 2017/0147297 A1 | 5/2017 | Krishnamurthy et al. |
| 2017/0147527 A1* | 5/2017 | Chandrasekaran ... G06F 15/167 |
| 2017/0149878 A1 | 5/2017 | Mutnuru |
| 2017/0163531 A1 | 6/2017 | Kumar et al. |
| 2017/0171158 A1 | 6/2017 | Hoy et al. |
| 2017/0237555 A1 | 8/2017 | Roullier et al. |
| 2017/0264663 A1 | 9/2017 | Bicket et al. |
| 2017/0339070 A1 | 11/2017 | Chang et al. |
| 2019/0205459 A1* | 7/2019 | Busjaeger ............ G06F 16/2282 |
| 2019/0297060 A1* | 9/2019 | Iverson ................. H04L 9/0643 |

FOREIGN PATENT DOCUMENTS

| | | |
|---|---|---|
| CN | 102164091 | 8/2011 |
| CN | 104320342 | 1/2015 |
| CN | 105740084 | 7/2016 |
| EP | 2228719 | 9/2010 |
| EP | 2439637 | 4/2012 |
| EP | 2645253 | 11/2014 |
| KR | 10-2015-0070676 | 5/2015 |
| TW | M394537 | 12/2010 |
| WO | WO 2009/155574 | 12/2009 |
| WO | WO 2010/030915 | 3/2010 |
| WO | WO 2013/158707 | 10/2013 |
| WO | 2017/161403 | 9/2017 |

OTHER PUBLICATIONS

Author Unknown, "5 Benefits of a Storage Gateway in the Cloud," Blog, TwinStrata, Inc., Jul. 25, 2012, XP055141645, 4 pages, https://web.archive.org/web/20120725092619/http://blog.twinstrata.com/2012/07/10//5-benefits-of-a-storage-gateway-in-the-cloud.

Author Unknown, "Joint Cisco and VMWare Solution for Optimizing Virtual Desktop Delivery: Data Center 3.0: Solutions to Accelerate Data Center Virtualization," Cisco Systems, Inc. and VMware, Inc., Sep. 2008, 10 pages.

Author Unknown, "A Look at DeltaCloud: The Multi-Cloud API," Feb. 17, 2012, 4 pages.

Author Unknown, "About Deltacloud," Apache Software Foundation, Aug. 18, 2013, 1 page.

Author Unknown, "Architecture for Managing Clouds, A White Paper from the Open Cloud Standards Incubator," Version 1.0.0, Document No. DSP-IS0102, Jun. 18, 2010, 57 pages.

(56) References Cited

OTHER PUBLICATIONS

Author Unknown, "Cloud Infrastructure Management Interface—Common Information Model (CIMI-CIM)," Document No. DSP0264, Version 1.0.0, Dec. 14, 2012, 21 pages.
Author Unknown, "Cloud Infrastructure Management Interface (CIMI) Primer," Document No. DSP2027, Version 1.0.1, Sep. 12, 2012, 30 pages.
Author Unknown, "CloudControl Documentation," Aug. 25, 2013, 14 pages.
Author Unknown, "Interoperable Clouds, A White Paper from the Open Cloud Standards Incubator," Version 1.0.0, Document No. DSP-IS0101, Nov. 11, 2009, 21 pages.
Author Unknown, "Microsoft Cloud Edge Gateway (MCE) Series Appliance," Iron Networks, Inc., 2014, 4 pages.
Author Unknown, "Open Data Center Alliance Usage: Virtual Machine (VM) Interoperability in a Hybrid Cloud Environment Rev. 1.2," Open Data Center Alliance, Inc., 2013, 18 pages.
Author Unknown, "Real-Time Performance Monitoring on Juniper Networks Devices, Tips and Tools for Assessing and Analyzing Network Efficiency," Juniper Networks, Inc., May 2010, 35 pages.
Author Unknown, "Use Cases and Interactions for Managing Clouds, A White Paper from the Open Cloud Standards Incubator," Version 1.0.0, Document No. DSP-ISO0103, Jun. 16, 2010, 75 pages.
Author Unknown, "Apache Ambari Meetup What's New," Hortonworks Inc., Sep. 2013, 28 pages.
Author Unknown, "Introduction," Apache Ambari project, Apache Software Foundation, 2014, 1 page.
Baker, F., "Requirements for IP Version 4 Routers," Jun. 1995, 175 pages, Network Working Group, Cisco Systems.
Beyer, Steffen, "Module "Data::Locations?!"," YAPC::Europe, London, UK,ICA, Sep. 22-24, 2000, XP002742700, 15 pages.
Blanchet, M., "A Flexible Method for Managing the Assignment of Bits of an IPv6 Address Block," Apr. 2003, 8 pages, Network Working Group, Viagnie.
Borovick, Lucinda, et al., "Architecting the Network for the Cloud," IDC White Paper, Jan. 2011, 8 pages.
Bosch, Greg, "Virtualization," last modified Apr. 2012 by B. Davison, 33 pages.
Broadcasters Audience Research Board, "What's Next," http://lwww.barb.co.uk/whats-next, accessed Jul. 22, 2015, 2 pages.
Cisco Systems, Inc. "Best Practices in Deploying Cisco Nexus 1000V Series Switches on Cisco UCS B and C Series Cisco UCS Manager Servers," Cisco White Paper, Apr. 2011, 36 pages, http://www.cisco.com/en/US/prod/collateral/switches/ps9441/ps9902/white_paper_c11-558242.pdf.
Cisco Systems, Inc., "Cisco Unified Network Services: Overcome Obstacles to Cloud-Ready Deployments," Cisco White Paper, Jan. 2011, 6 pages.
Cisco Systems, Inc., "Cisco Intercloud Fabric: Hybrid Cloud with Choice, Consistency, Control and Compliance," Dec. 10, 2014, 22 pages.
Cisco Technology, Inc., "Cisco Expands Videoscape TV Platform Into the Cloud," Jan. 6, 2014, Las Vegas, Nevada, Press Release, 3 pages.
Citrix, "Citrix StoreFront 2.0" White Paper, Proof of Concept Implementation Guide, Citrix Systems, Inc., 2013, 48 pages.
Citrix, "CloudBridge for Microsoft Azure Deployment Guide," 30 pages.
Citrix, "Deployment Practices and Guidelines for NetScaler 10.5 on Amazon Web Services," White Paper, citrix.com, 2014, 14 pages.
CSS Corp, "Enterprise Cloud Gateway (ECG)—Policy driven framework for managing multi-cloud environments," original published on or about Feb. 11, 2012; 1 page; http://www.css-cloud.com/platform/enterprise-cloud-gateway.php.
Fang K., "LISP MAC-EID-TO-RLOC Mapping (LISP based L2VPN)," Network Working Group, Internet Draft, Cisco Systems, Jan. 2012, 12 pages.
Ford, Bryan, et al., Peer-to-Peer Communication Across Network Address Translators, In USENIX Annual Technical Conference, 2005, pp. 179-192.
Gedymin, Adam, "Cloud Computing with an emphasis on Google App Engine," Sep. 2011, 146 pages.
Good, Nathan A., "Use Apache Deltacloud to administer multiple instances with a single API," Dec. 17, 2012, 7 pages.
Herry, William, "Keep It Simple, Stupid: OpenStack nova-scheduler and its algorithm", May 12, 2012, IBM, 12 pages.
Hewlett-Packard Company, "Virtual context management on network devices", Research Disclosure, vol. 564, No. 60, Apr. 1, 2011, Mason Publications, Hampshire, GB, Apr. 1, 2011, 524.
Juniper Networks, Inc., "Recreating Real Application Traffic in Junosphere Lab," Solution Brief, Dec. 2011, 3 pages.
Kenhui, "Musings on Cloud Computing and IT-as-a-Service: [Updated for Havana] Openstack Computer for VSphere Admins, Part 2: Nova-Scheduler and DRS", Jun. 26, 2013, Cloud Architect Musings, 12 pages.
Kolyshkin, Kirill, "Virtualization in Linux," Sep. 1, 2006, XP055141648, 5 pages, https://web.archive.org/web/20070120205111/http://download.openvz.org/doc/openvz-intro.pdf.
Kumar, S., et al., "Infrastructure Service Forwarding for NSH,"Service Function Chaining Internet Draft, draft-kumar-sfc-nsh-forwarding-00, Dec. 5, 2015, 10 pages.
Kunz, Thomas, et al., "OmniCloud—The Secure and Flexible Use of Cloud Storage Services," 2014, 30 pages.
Lerach, S.R.O., "Golem," http://www.lerach.cz/en/products/golem, accessed Jul. 22, 2015, 2 pages.
Linthicum, David, "VM Import could be a game changer for hybrid clouds", InfoWorld, Dec. 23, 2010, 4 pages.
Logan, Marcus, "Hybrid Cloud Application Architecture for Elastic Java-Based Web Applications," F5 Deployment Guide Version 1.1, 2016, 65 pages.
Lynch, Sean, "Monitoring cache with Claspin" Facebook Engineering, Sep. 19, 2012, 5 pages.
Meireles, Fernando Miguel Dias, "Integrated Management of Cloud Computing Resources," 2013-2014, 286 pages.
Meraki, "Meraki releases industry's first cloud-managed routers," Jan. 13, 2011, 2 pages.
Mu, Shuai, et al., "uLibCloud: Providing High Available and Uniform Accessing to Multiple Cloud Storages," 2012 IEEE, 8 pages.
Naik, Vijay K., et al., "Harmony: A Desktop Grid for Delivering Enterprise Computations," Grid Computing, 2003, Fourth International Workshop on Proceedings, Nov 17, 2003, pp. 1-11.
Nair, Srijith K. et al., "Towards Secure Cloud Bursting, Brokerage and Aggregation," 2012, 8 pages, www.flexiant.com.
Nielsen, "SimMetry Audience Measurement—Technology," http://www.nielsen-admosphere.eu/products-and-services/simmetry-audience-measurement-technology/, accessed Jul. 22, 2015, 6 pages.
Nielsen, "Television," http://www.nielsen.com/us/en/solutions/measurement/television.html, accessed Jul. 22, 2015, 4 pages.
Open Stack, "Filter Scheduler," updated Dec. 17, 2017, 5 pages, accessed on Dec. 18, 2017, https://docs.openstack.org/nova/latest/user/filter-scheduler.html.
Quinn, P., et al., "Network Service Header," Internet Engineering Task Force Draft, Jul. 3, 2014, 27 pages.
Quinn, P., et al., "Service Function Chaining (SFC) Architecture," Network Working Group, Internet Draft, draft-quinn-sfc-arch-03.txt, Jan. 22, 2014, 21 pages.
Rabadan, J., et al., "Operational Aspects of Proxy-ARP/ND in EVPN Networks," BESS Worksgroup Internet Draft, draft-snr-bess-evpn-proxy-arp-nd-02, Oct. 6, 2015, 22 pages.
Saidi, Ali, et al., "Performance Validation of Network-Intensive Workloads on a Full-System Simulator," Interaction between Operating System and Computer Architecture Workshop, (IOSCA 2005), Austin, Texas, Oct. 2005, 10 pages.
Shunra, "Shunra for HP Software; Enabling Confidence in Application Performance Before Deployment," 2010, 2 pages.
Son, Jungmin, "Automatic decision system for efficient resource selection and allocation in inter-clouds," Jun. 2013, 35 pages.
Sun, Aobing, et al., "IaaS Public Cloud Computing Platform Scheduling Model and Optimization Analysis," Int. J. Communications, Network and System Sciences, 2011, 4, 803-811, 9 pages.
Szymaniak, Michal, et al., "Latency-Driven Replica Placement", vol. 47 No. 8, IPSJ Journal, Aug. 2006, 12 pages.

(56) References Cited

OTHER PUBLICATIONS

Toews, Everett, "Introduction to Apache jclouds," Apr. 7, 2014, 23 pages.
Von Laszewski, Gregor, et al., "Design of a Dynamic Provisioning System for a Federated Cloud and Bare-metal Environment," 2012, 8 pages.
Wikipedia, "Filter (software)", Wikipedia, Feb. 8, 2014, 2 pages, https://en.wikipedia.org/w/index.php?title=Filter_%28software%29&oldid=594544359.
Wikipedia; "Pipeline (Unix)", Wikipedia, May 4, 2014, 4 pages, https://en.wikipedia.org/w/index.php?title=Pipeline2/028Unix%29&oldid=606980114.
Ye, Xianglong, et al., "A Novel Blocks Placement Strategy for Hadoop," 2012 IEEE/ACTS 11$^{th}$ International Conference on Computer and Information Science, 2012 IEEE, 5 pages.

\* cited by examiner

SYSTEM FOR ASSOCIATION OF CUSTOMER INFORMATION ACROSS SUBSCRIBERS

TECHNICAL FIELD

The subject matter of this disclosure relates in general to the field of computerized management of customer information, and more specifically to a platform for identifying associations between customer information.

BACKGROUND

Businesses and other organizations often store information associated with customers or other individuals or entities in order to better serve those customers or for some other purpose. For example, an e-commerce platform may store a customer's name and mailing address for shipping products to the customer, account name and password to enable a customer to login to an e-commerce website or for other services, age, and/or an order history. Some e-commerce platforms may use the customer information in order to provide better and more customized service such as suggesting other products that the customer may be interested in. Other types of platforms (e.g., social media platforms, financial services platforms, etc.) may store user profile information, activity information on the platform or other platforms, or other information.

However, in many cases, the information collected may be incomplete or fragmented. For example, the e-commerce platform in the example above may receive a call from customer from a phone number. Although the e-commerce platform has the customer's phone number, it is unable to retrieve other information associated with the customer (e.g., the customer name, mailing address, or order history) because the e-commerce platform does not have the customer's phone number in the customer record. Even though the e-commerce platform has access to the phone number and other customer information, the e-commerce platform is unable to leverage the customer information because the customer information is fragmented and there is no association between the phone number and the rest of the customer information.

The fragmentation of customer information may lead to a degraded level of service and/or an increase the time and effort needed to provide services to customers, which increases costs to the business. For example, instead of being able to automatically retrieve the customer record, a customer service representative of the e-commerce platform may need to request additional information from the customer (e.g., an account name, an order number, etc.) in order to identify the customer record and retrieve it.

BRIEF DESCRIPTION OF THE FIGURES

In order to describe the manner in which the above-recited and other advantages and features of the disclosure can be obtained, a more particular description of the principles briefly described above will be rendered by reference to specific embodiments that are illustrated in the appended drawings. Understanding that these drawings depict only embodiments of the disclosure and are not therefore to be considered to be limiting of its scope, the principles herein are described and explained with additional specificity and detail through the use of the accompanying drawings in which.

DESCRIPTION OF EXAMPLE EMBODIMENTS

Figure 1:
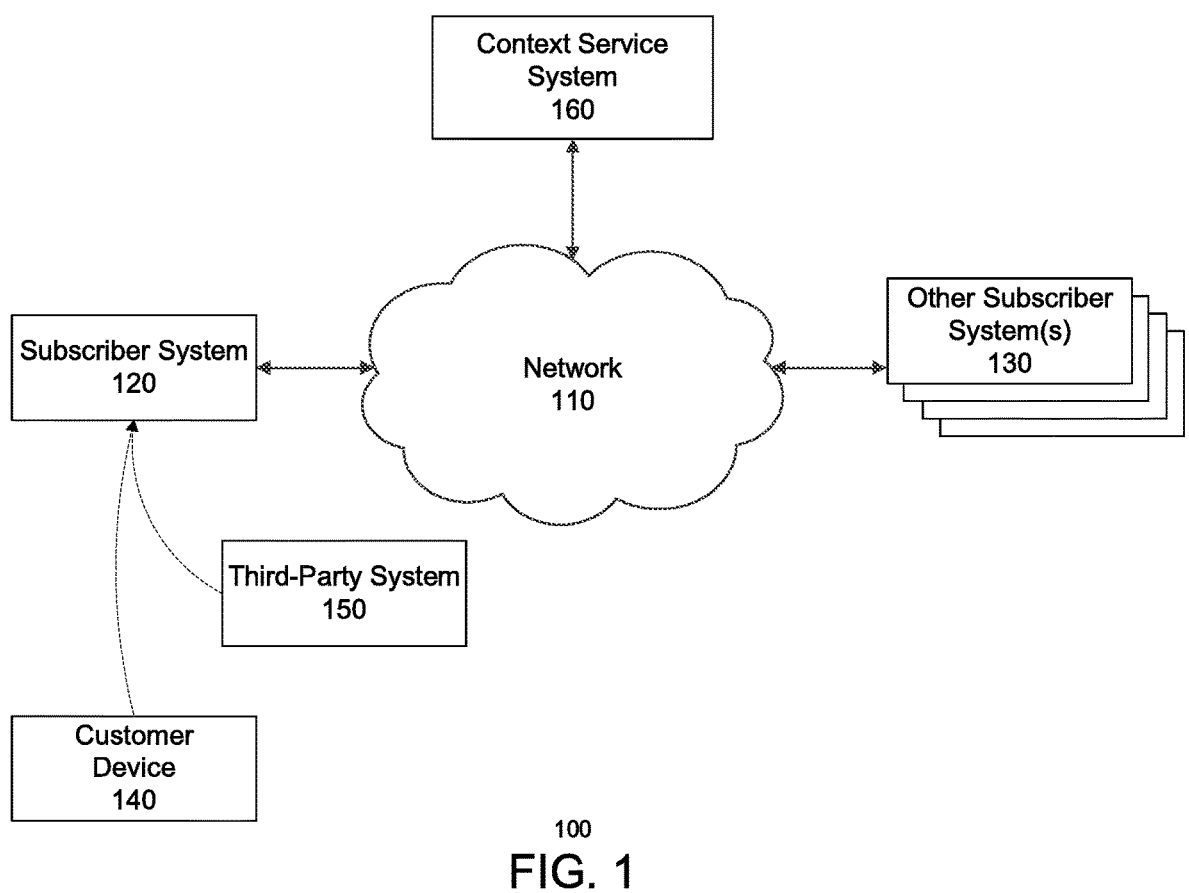
FIG. 1 is a conceptual block diagram illustrating an example network environment that includes a context service system, in accordance with various embodiments of the subject technology.

The detailed description set forth below is intended as a description of various configurations of embodiments and is not intended to represent the only configurations in which the subject matter of this disclosure can be practiced. The appended drawings are incorporated herein and constitute a part of the detailed description. The detailed description includes specific details for the purpose of providing a more thorough understanding of the subject matter of this disclosure. However, it will be clear and apparent that the subject matter of this disclosure is not limited to the specific details set forth herein and may be practiced without these details. In some instances, structures and components are shown in block diagram form in order to avoid obscuring the concepts of the subject matter of this disclosure.

Overview

The disclosed technology relates to a context service system configured to receive, from a subscriber, a shared customer lookup request that includes a first customer data identifier and identify, in a shared data partition, a second customer data identifier associated with the first customer data identifier. The context service system is further configured to determine that the second customer data identifier is associated with customer information in a subscriber data partition and transmit, to the subscriber system, the customer information from the subscriber data partition.

EXAMPLE EMBODIMENTS

As described above, fragmentation of customer information and/or the incompleteness of customer records may lead to various detrimental results including, for example, a degraded level of service, an increase the time and effort needed to provide services, or an increase in costs to provide services. In order to make their customer records more complete and robust, organizations may be tempted to share and exchange information about customers through partnerships or through third-party data brokers. However, the information collected may also include personally identifiable information (PII) or other private information that cannot (legally) be shared without the consent of the customer. In other cases, an organization may not wish to share collected information for various other business reasons. For example, sharing collected information may anger customers or the public. Furthermore, the information collected may also be a valuable resource that may serve as a competitive advantage over other businesses or organizations.

Aspects of the subject technology relate to a context service system configured to leverage the customer information shared across multiple subscribers and allow subscribers to share associations between different elements of customer information without exposing the customer information. As will be discussed in further detail, the context service system generates a shared partition of data that contains associations of different elements of customer information provided by a subscriber group. The context service system facilitates the querying of the shared partition of data by a subscriber to determine whether a first element of customer information provided by the subscriber is associated with another element of customer information that is already known to the subscriber.

By querying the context service system, the subscriber can determine whether an element of customer information is associated with a customer record already known to the subscriber. As an illustrative example, a call center system may receive a phone call and identify the phone number (e.g., using caller ID) associated with the phone call. However, the phone number may be previously unknown to the call center system. Accordingly, the call center system may not know any context for the call and may not be able to provide certain services or service levels because of the lack of context. In response to receiving the call, the call center system may transmit a customer lookup request that includes the unknown phone number to the context service system.

The context service system may determine whether the phone number is associated with any other items of customer information in a shared partition of data generated based on information from a number of subscribers. If an association is found with another element of customer information (e.g., an address or email address), the context service system may determine if the element of customer information is already known to the call center system. If the element of customer information is already known to the call center system, the context service system may inform the call center system that the unknown phone number is actually associated with the element of customer information (e.g., an address or email address) or provide the call center system with the call center system's record including the element of customer information.

In this way, the call center system may determine that the previously unknown phone number is actually associated with an existing customer record (e.g., the customer record with the address or email address), update the call center system's customer record, and/or provide additional services or benefits enabled by the new contextual information (e.g., the customer record) provided by the context service system. Furthermore, although the context service system leverages information shared across a number of subscribers in the shared partition of data, the context service system does not expose any elements of customer information that is unknown to a subscriber. For example, in the example above, the call center system already knows of the phone number and the customer record for the caller, the context service system merely provided the association between the two elements of customer information. Accordingly, the context service system prevents and/or limits the dissemination of customer information, including personally identifiable information (PII) or other sensitive information.

For illustrative purposes, various embodiments described herein may refer to customer information or elements of customer information. However, these embodiments and others may also readily apply to other information stored by subscribers and not necessarily a "customer." For example, other types of information that is applicable include account information, user information, or profile information. Furthermore, the information may be associated with an individual, a company, an organization, or other entity.

Various embodiments of the disclosure are discussed in detail below. While specific implementations are discussed, it should be understood that this is done for illustrative purposes only. A person skilled in the relevant art will recognize that other components and configurations may be used without departing from the spirit and scope of the disclosure.

FIG. 1 is a conceptual block diagram illustrating an example network environment 100 that includes a context service system 160, in accordance with various embodiments of the subject technology. The network environment 100 described with respect to FIG. 1 includes the context service system 160, a subscriber system 120, a customer device 140, a third-party system 150, and other subscriber systems 130. However, in other embodiments, other network environment configurations may also be used.

The subscriber system 120 and other subscriber systems 130 are configured to communicate with the context service system 160 via a network 110. The network 110 may include, for example, any one or more of a cellular network, a satellite network, a personal area network (PAN), a local area network (LAN), a wide area network (WAN), a broadband network (BBN), the Internet, and the like. The network environment 100 can be a public network, a private network, or a combination thereof. The network environment 100 may be implemented using any number of communications links associated with one or more service providers, including one or more wired communication links, one or more wireless communication links, or any combination thereof. Additionally, the network 110 can be configured to support the transmission of data formatted using any number of protocols.

The subscriber system 120 and/or subscriber systems 130 may be associated with a financial services entity, a medical industry entity, a business entity, an e-commerce entity, or any other entity that deals with customer information, account information, user information, or profile information. The subscriber system 120 and/or subscriber systems 130 may also be associated with a particular function or purpose such as a call center, a contact center, a sales organization or group, a customer service center, a help desk, or other group that may deal with customer information, account information, user information, or profile information. The subscriber system 120 and/or subscriber systems 130 may each manage a separate database of customer information.

According to some embodiments, the subscriber system 120 may obtain an element of customer information such as a phone number, email address, mailing address, user name, or other identifier. The element of customer information may be generated by the subscriber system or received via an external party such as customer device 140 or third-party system 150. For example, the third-party system 150 may be configured to perform a task with the subscriber system 120 via an application programming interface (API) provided by the subscriber system 120 and the third-party system 150 may provide the subscriber system 120 with the element of customer information for a user, account, or other entity during the course of performing that task.

In another example, the customer device 140 may communicate with the subscriber system 120 and provide, either directly or indirectly (e.g., via the communication protocols used), the element of customer information. The communications may occur via, for example, a cellular network, a landline telephone network, an short message service network, a chat or messaging service, or any number of other communication technologies.

The context service system 160 enables the subscriber system 120 to determine whether the element of customer information is associated with other information that is already in the subscriber system's database of customer information by leveraging customer information associated with the other subscriber systems 130 without revealing any of the customer information associated with the other subscriber systems 130.

Figure 2:
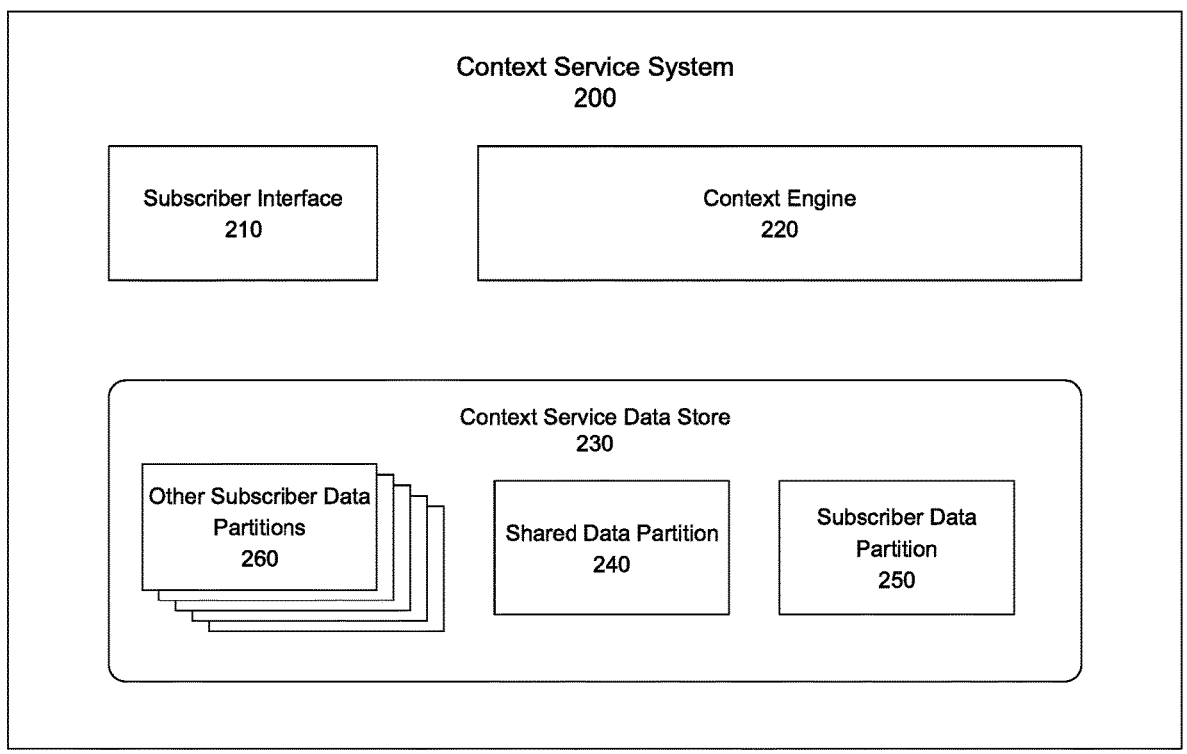
FIG. 2 is a conceptual block diagram illustrating an example context service system, in accordance with various embodiments of the subject technology.

FIG. 2 is a conceptual block diagram illustrating an example context service system 200, in accordance with various embodiments of the subject technology. The context service system 200 described with respect to FIG. 2 includes a subscriber interface 210, a context engine 220, and a context service data store 230. The context service data store 230 is shown to include a shared data partition 240 and one or more subscriber data partitions. However, in other embodiments, configurations may also be used including additional components, fewer components, or alternative components.

The subscriber interface 210 is configured to communicate with one or more subscribers. For example, the subscriber interface 210 may receive customer lookup requests that include an element of customer information such as a customer data identifier and provide subscribers with customer records or other customer data identifiers associated with the element of customer information in the customer lookup request.

As will be discussed further below, the context engine 220 is configured to identify other customer information that is associated with the element of customer information in the customer lookup request and determine whether the subscriber that submitted the customer lookup request has access to the associated customer information.

The context service data store 230 may store customer information associated with the one or more subscribers of the context service system 200. According to some embodiments, the context service data store 230 may include a shared data partition 240 and a subscriber data partition for each subscriber of the context data store. For example, in FIG. 2, subscriber data partition 250 may be associated with the subscriber system 120 of FIG. 1 and the other subscriber data partitions 260 may be associated with the other subscriber systems 130 of FIG. 1.

The subscriber data partitions 250 and 260 include sets of customer information (e.g., customer records) known by their corresponding subscriber. For example, subscriber data partition 250 may include sets of customer information or customer records that the subscriber system 120 of FIG. 1 is aware of. Subscriber data partition 250 may be provided by the subscriber and updated over time. In some embodiments, the subscriber data partition 250 is synchronized with a data store managed by the subscriber system (e.g., subscriber system 120 of FIG. 1). Although FIG. 2 is shown with the context service data store 230 including the subscriber data partitions 250 and 260, in other embodiments, one or more subscriber data partitions may be stored by a subscriber system and accessed by the context service system 200 via network communications.

The shared data partition 240 includes sets or records of related customer information that is generated based on the customer information in the subscriber data partitions 250 and 260 or customer information provided by subscriber systems. The information in the shared data partition 240 may include information that each subscriber specifically permits to be used by the context service system 200 to provide associations to other systems.

According to some embodiments, an end-to-end encryption scheme may be used to protect the customer information stored by the context service data store 230. In other words, the subscriber systems may encrypt some or all data transmitted and/or stored by the context service data store 230. For example, a subscriber system may encrypt the entire customer record for all customer records to be stored by the context service system 200 or a portion of the customer records (e.g., any personally identifiable information (PII), private information, or otherwise sensitive information). The encryption and decryption scheme and/or various parameters used for encryption and decryption may be known only to the subscriber system. In this way, a subscriber may be assured with an additional layer of protection that prevents other subscribers or even the context service system 200 from unpermitted access to the subscriber's encrypted customer information.

Figure 3:
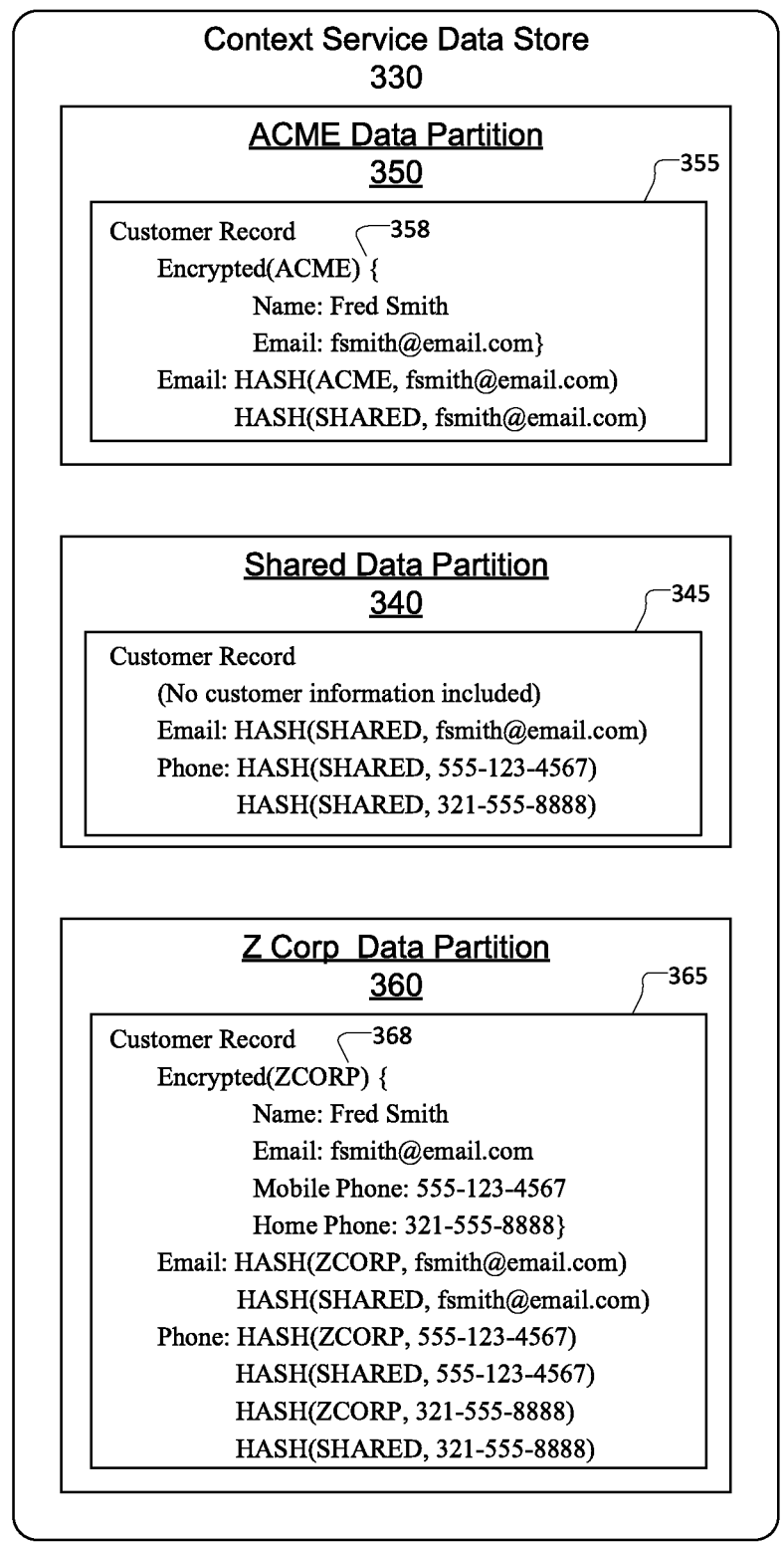
FIG. 3 is a conceptual block diagram illustrating an example context service data store, in accordance with various embodiments of the subject technology.

FIG. 3 is a conceptual block diagram illustrating an example context service data store 330, in accordance with various embodiments of the subject technology. For illustrative purposes, the context service data store 330 includes a shared data partition 340, an ACME data partition for a subscriber named "ACME," and a Z Corp data partition for a subscriber named "Z Corp." Each data partition may include a number of sets of associated customer information or customer records. To conserve space, each of the data partitions 340, 350, and 360 in FIG. 3 are shown with one customer record or set of associated customer information each. For example, ACME data partition 350 includes customer record 355, shared data partition 340 includes customer record 345, and Z Corp data partition 360 includes customer record 365.

The context service data store 330 is implemented using an encryption scheme where all or portions of the customer information is encrypted using a cryptographic function. The encryption and decryption scheme and/or various parameters used for encryption and decryption may be known only to the subscriber system or entities that the subscriber system entrusts in order to provide an additional layer of protection that prevents other subscribers or even the context service system 200 from unpermitted access to the subscriber's encrypted customer information. For example, in customer record 355 in the ACME data partition 350, the customer information 358 in the customer record is encrypted. Similarly, in customer record 365 in the Z Corp data partition 360, the customer information 368 in the customer record is encrypted.

As will be explained in further detail below, in order to allow the context service system to determine whether an element of customer information is associated with the encrypted information that in the subscriber data partition, the subscriber system may hash each element of customer information using a subscriber specific cryptographic salt value and a hash function. As an added advantage, the hash value for the element of customer information enables the context service system to determine whether the element of customer information is associated with a customer record in the subscriber data partition without revealing the element of customer information to the context service system or any other party.

For example, for the email address "fsmith@email.com" in customer record 355, the ACME subscriber system may use an "ACME" subscriber salt value to generate a customer data identifier (e.g., a hash value) for the email address. The ACME subscriber system may then transmit the customer data identifier to the context service system for storage in the ACME data partition 350. Similarly, in customer record 365, the Z Corp subscriber system may generate a customer data identifier (e.g., a hash value) for the email address, mobile phone number, or home phone number based on a "ZCORP" subscriber salt value. The Z Corp subscriber system may then transmit the customer data identifiers to the context service system for storage in the Z Corp data partition 360.

Hash values generated based on a shared cryptographic salt value further enable the context service system to determine whether an element of customer information is associated with the encrypted information that in the subscriber data partition based on information in the shared data partition.

For example, for the email address "fsmith@email.com" in customer record 355, the ACME subscriber system may use a shared salt value, which is represented by the "SHARED" string in the hash function shown in customer record 355, to generate a customer data identifier (e.g., a hash value) for the email address. The ACME subscriber system may then transmit the customer data identifier to the context service system for storage in the ACME data partition 350. Similarly, in customer record 365, the Z Corp subscriber system may generate a customer data identifier (e.g., a hash value) for the email address, mobile phone number, or home phone number based on the shared salt value. The Z Corp subscriber system may then transmit the customer data identifiers to the context service system for storage in the Z Corp data partition 360.

The context service system may identify the hashes of customer information in customer records across the various subscriber data partitions that have been hashed using the shared salt value and aggregate them into the shared data partition 340. For example, customer record 345 includes all of the hash values of customer information that have been hashed using the shared salt value. Since the context service system does not store the actual customer information in the context service data store 330 but instead stores customer data identifiers (e.g., the hash values) associated with the customer information, the customer information is prevented from being shared or accessed either intentionally or unintentionally. Furthermore, in some embodiments, the context service system may not know any of the salt values (e.g., the shared salt value or the subscriber salt values) used to encrypt the customer information. Accordingly, even the context service system may not access the customer information.

According to some embodiments, a key management server may be configured to disseminate salt values to the subscriber systems. For example, the key management server may provide a subscriber system with a shared salt value that is also provided to all other subscriber systems as well as a subscriber salt value that is only provided to the subscriber system. Accordingly, a subscriber system may use the various salt values to determine which elements of subscriber's customer information are to be used by the context service system to assist other subscribers.

Although FIG. 2 and FIG. 3 show only a single shared data partition 340 for illustrative purposes, in other embodiments, multiple shared data partitions may also be implemented. Multiple shared data partitions may allow for subscribers to have different sharing levels with different groups. For example, shared data partitions may be established for a group of business partners, a group of competitors, a group of customers, and/or a general public group and each group may be assigned a different shared salt value for the group. Each subscriber system belonging to the group may obtain a shared salt value for the group of subscribers. Accordingly, a subscriber system may receive multiple shared salt values for a multitude of groups and use the shared salt values to determine which elements of customer information to allow the context service system to use to assist other subscribers.

Figure 4:
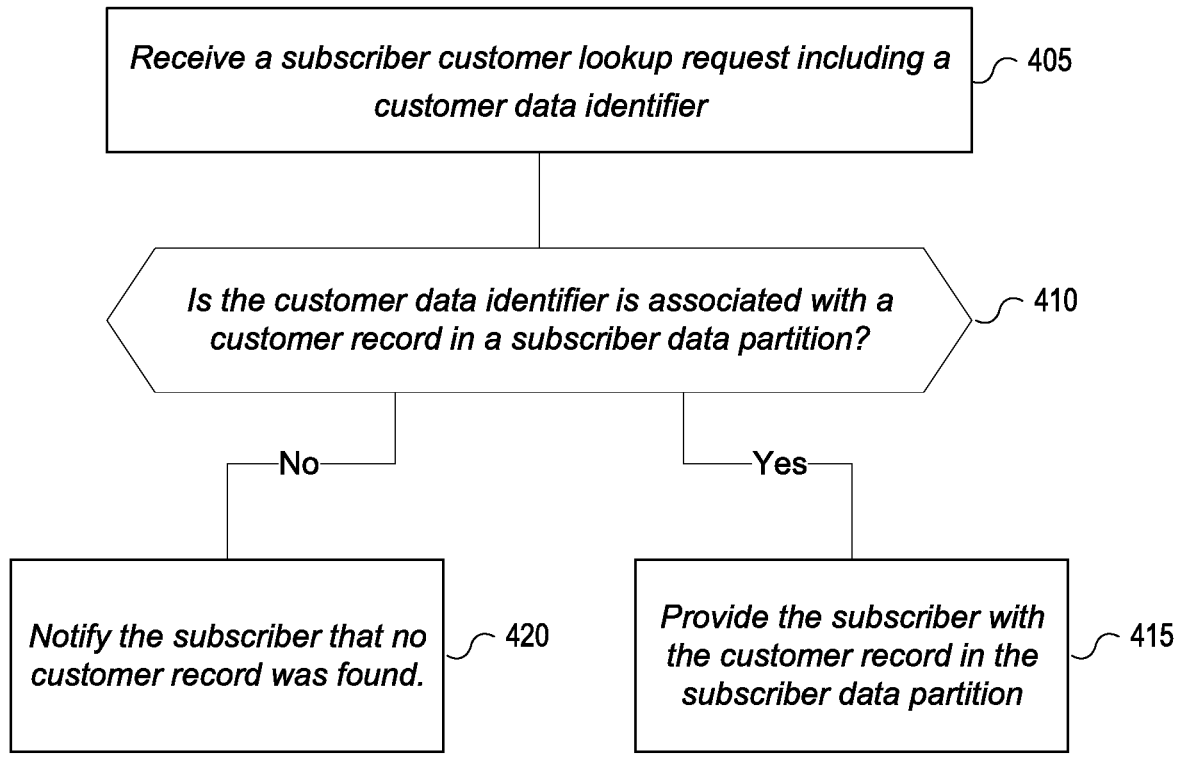
FIG. 4 shows an example process for providing a subscriber system with a customer record from a data partition associated with the subscriber system, in accordance with various embodiments of the subject technology.

FIG. 4 shows an example process 400 for providing a subscriber system with a customer record from a data partition associated with the subscriber system, in accordance with various embodiments of the subject technology. It should be understood that, for any process discussed herein, there can be additional, fewer, or alternative steps performed in similar or alternative orders, or in parallel, within the scope of the various embodiments unless otherwise stated. The process 400 can be performed by a system such as, for example, the context service system 200 of FIG. 2 or a similar computing platform.

A subscriber system may receive an element of customer information during operation of the subscriber system. For example, a call center system may receive a call or text from a phone number. Alternatively, the call center may receive an email or message from a messaging service from an email address or user name that is not in the call center system's database. The subscriber system may attempt to determine if there is any additional contextual information associated with the element of customer information.

According to some embodiments, the subscriber system may maintain a local database of customer information and determine if the element of customer information is associated with other customer information (e.g., a customer account or record). However, in other embodiments, the subscriber system may not maintain a local database of customer information or may rely on the context service system to store the subscriber system's customer information. Accordingly, the subscriber system may generate a subscriber customer lookup request that includes a customer data identifier associated with the element of customer information and transmit the request to the context service system. In some embodiments, the customer data identifier may be the element of customer information itself. However, in embodiments where encryption is used, the customer data identifier may be generated based on the application of a hashing function on the element of customer information using a subscriber salt value for the subscriber system.

At operation 405, the context service system receives the subscriber customer lookup request and determines whether the customer data identifier in the subscriber customer lookup request is associated with a customer record in the subscriber's data partition at operation 410. If a customer record is associated with the customer data identifier, the customer record may be returned to the subscriber system at operation 415.

If no customer record is found, at operation 420, the context service system may notify the subscriber system that no customer record was found in the subscriber data partition associated with the subscriber system. If no customer record was found in the subscriber data partition associated with the subscriber system, the subscriber system may wish to query the shared data partition for customer records associated with the element of customer information, which leads to process 500 of FIG. 5. Alternatively, even if a customer record is found in the subscriber data partition, the subscriber system may wish to determine whether other information in the subscriber data partition may also be associated with the element of customer information and the customer record that was found. This can also be accomplished through process 500 of FIG. 5.

Figure 5:
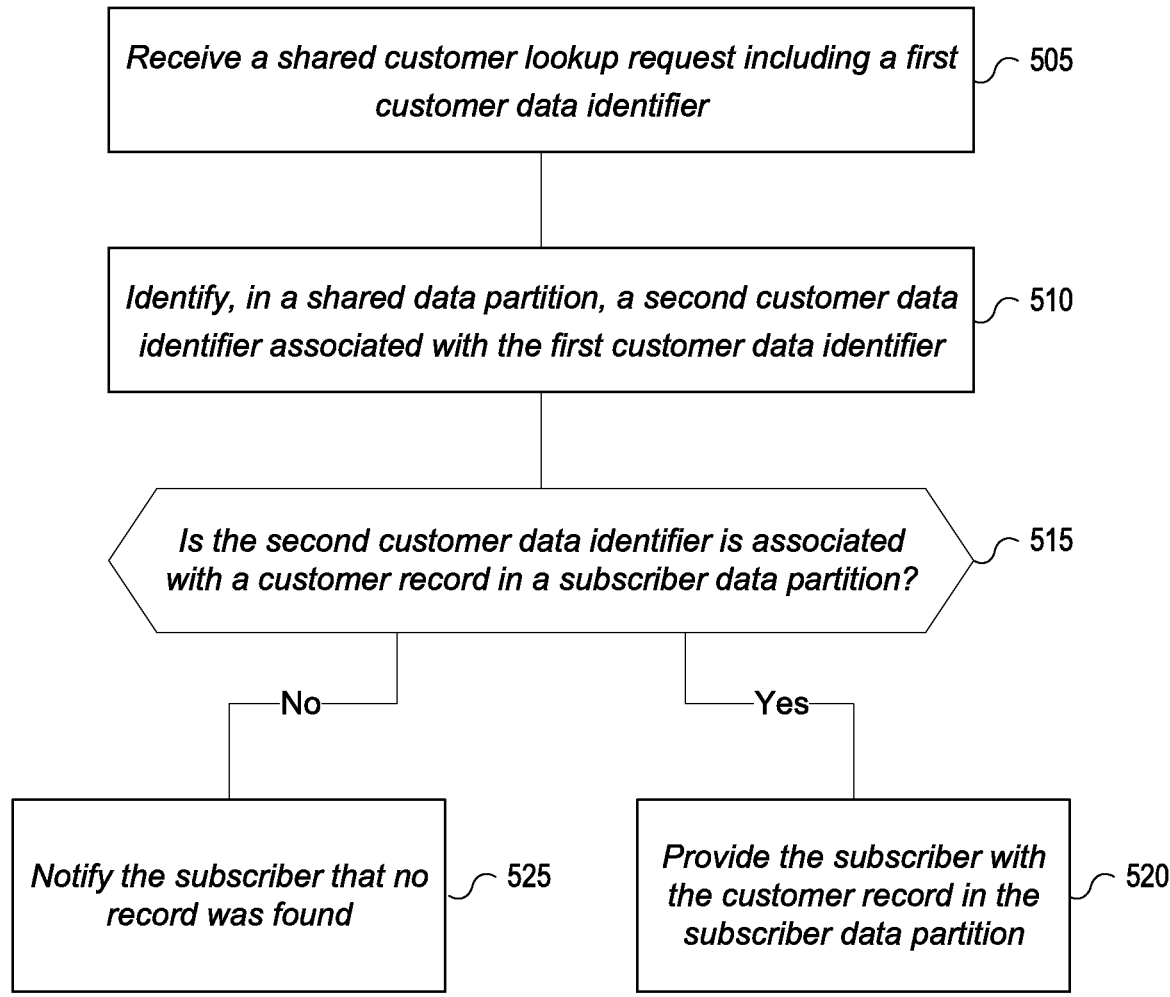
FIG. 5 shows an example process for providing a subscriber system with a customer record from a shared data partition, in accordance with various embodiments of the subject technology.

FIG. 5 shows an example process 500 for providing a subscriber system with a customer record from a shared data partition, in accordance with various embodiments of the subject technology. It should be understood that, for any process discussed herein, there can be additional, fewer, or alternative steps performed in similar or alternative orders, or in parallel, within the scope of the various embodiments unless otherwise stated. The process 500 can be performed by a system such as, for example, the context service system 200 of FIG. 2 or a similar computing platform.

To query the shared data partition for customer records associated with the element of customer information, the subscriber system may generate a shared customer lookup request that includes a first customer data identifier associated with the element of customer information and transmit the request to the context service system. In some embodiments, the first customer data identifier may be the element of customer information itself. In other embodiments, the first customer data identifier may be generated by applying a hash function to the element of customer information using a shared salt value.

At operation 505, the context service system may receive the shared customer lookup request including the first customer data identifier. The context service system may query the shared data partition to determine if there is another customer data identifier (e.g., another hash value associated with different element of customer data) that is associated with the first customer data identifier included in the shared customer lookup request.

At operation 510, the context service system may identify a second customer data identifier in the shared data partition that is associated with the first customer data identifier. The context service system may then determine whether the second customer data identifier is associated with a customer record in a subscriber data partition at operation 515. If there is a customer record in the subscriber data partition, the context service system may provide the customer record to the subscriber system at operation 520. If there is no customer record in the subscriber data partition, the context service system notifies the subscriber system that no record was found at operation 525.

Figure 6:
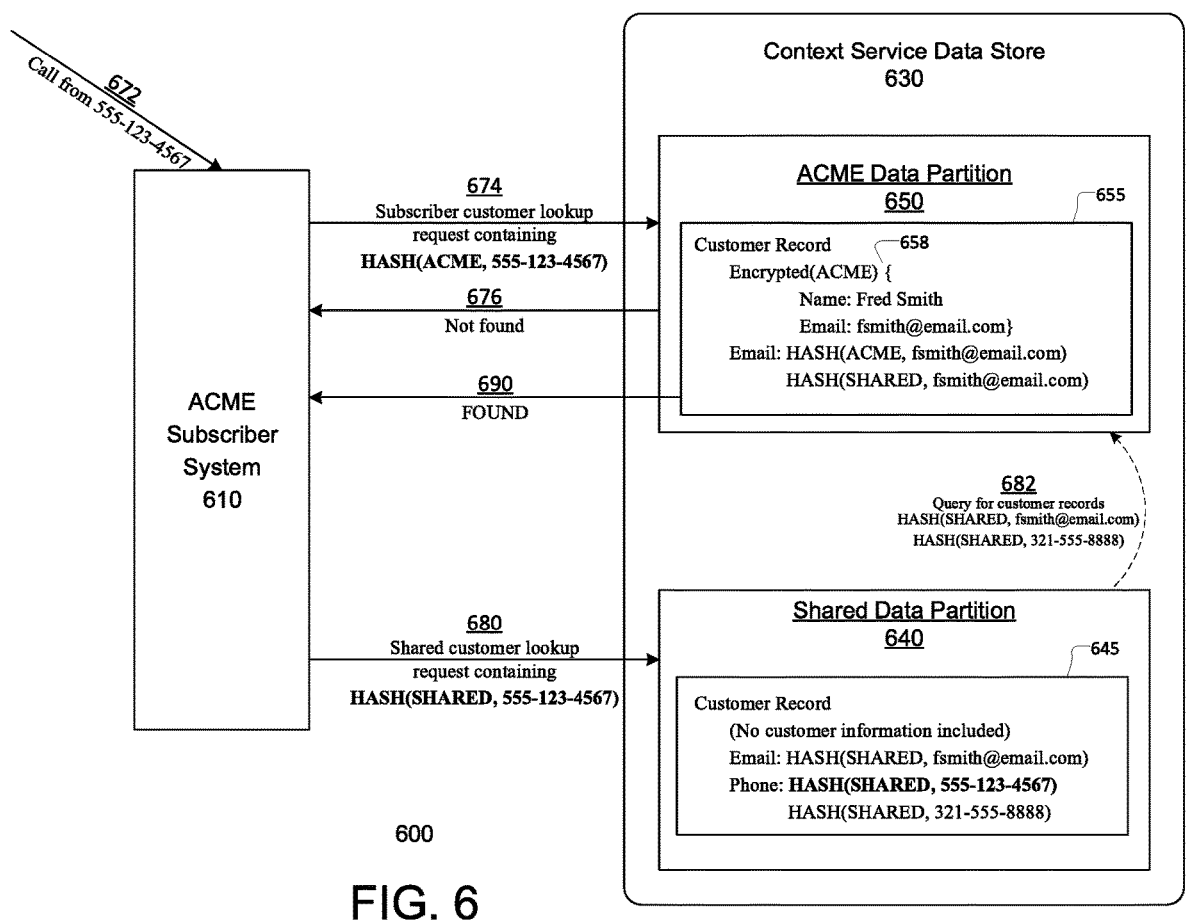
FIG. 6 is a conceptual block diagram illustrating an example scenario, in accordance with various embodiments of the subject technology.

FIG. 6 is a conceptual block diagram illustrating an example scenario 600, in accordance with various embodiments of the subject technology. The scenario 600 includes an ACME subscriber system 610 and a context service data store 630 and may help to illustrate the processes 400 and 500 of FIGS. 4 and 5. The other components of the context service system associated with the context service data store 630 are not shown in FIG. 6 for illustrative purposes. The context service data store 630 is shown containing a subscriber partition for an "ACME" subscriber 650 and a shared data partition 640. However, the context service data store 630 may contain many other shared data partitions and/or subscriber partitions. For illustrative purposes, each data partition is shown containing a record for customer "Frank Smith." However, the data partitions may contain many more customer records or sets of associated data.

According to some embodiments, the context service system may enable a subscriber to retrieve a customer record in the subscriber's data partition that is associated with a customer data identifier (e.g., an element of customer information or a hash value for the element of customer information) provided in a customer lookup request. In some cases, the customer record may be located based on information in the subscriber's data partition. However, in other cases, the context service system may leverage the associations in the shared data partition to identify the customer record in the subscriber's data partition.

In the scenario 600 of FIG. 6, the ACME subscriber system 610 may come across an element of customer information. In particular, the ACME subscriber system 610 may receive a call 672 from a phone number 555-123-4567 that is unknown to the ACME subscriber system. The phone number of 555-123-4567 may be the element of customer information in this scenario 600, but in other scenarios, user names, email addresses, social media account identifiers, or any other identifiers may be used as elements of customer information and the subscriber system 610 may come across the element of customer information by other means.

To determine whether the ACME data partition 650 contains information associated with the received phone number, the ACME subscriber system 610 may generate a hash value for the received phone number using an ACME subscriber salt value, which is represented as "HASH (ACME, 555-123-4567)" in FIG. 6. The ACME subscriber system 610 inserts the hash value in a subscriber customer lookup request 674 and transmits the subscriber customer lookup request 674 to the context service system.

The context service system receives the subscriber customer lookup request 674 and determines whether the customer data identifier "HASH(ACME, 555-123-4567)" in the subscriber customer lookup request is associated with a customer record in the subscriber's data partition 650. In the scenario 600 of FIG. 6, no customer record is found. Accordingly, the context service system may generate and transmit a notification 676 to the ACME subscriber system 610 informing the subscriber system that no customer record was found in the subscriber's data partition 650.

The ACME subscriber system 610 receives the notification 676 and may wish to query the leverage the information in the shared data partition 640 to determine whether the ACME data partition 650 contains information associated with the received phone number. Accordingly, the ACME subscriber system 610 generates a hash value for the received phone number using a shared subscriber salt value, which is represented as "HASH(SHARED, 555-123-4567)" in FIG. 6. The ACME subscriber system 610 inserts the hash value in a shared customer lookup request 680 and transmits the shared customer lookup request 680 to the context service system.

The context service system receives the shared customer lookup request 680 and determines whether the customer data identifier "HASH(SHARED, 555-123-4567)" in the shared customer lookup request is associated with a customer record in the shared data partition 640. In the scenario 600 of FIG. 6, customer record 645 is found. More specifically, customer record 645 also includes a matching customer data identifier with the same "HASH(SHARED, 555-123-4567)" value.

Based on the found customer record 645, the context service system identifies two additional customer data identifiers ("HASH(SHARED, fsmith@email.com)" and "HASH(SHARED, 321-555-8888)") that are associated with the customer data identifier ("HASH(SHARED, 555-123-4567)") included in the shared customer lookup request.

The context service system may then query 682 the ACME data partition 650 to determine whether either of the two identified customer data identifiers ("HASH(SHARED, fsmith@email.com)" and "HASH(SHARED, 321-555-8888)") are associated with a customer record in the ACME data partition 650. In the scenario 600 of FIG. 6, no corresponding customer record is found for "HASH (SHARED, 321-555-8888)." However, customer record 655 is found for "HASH(SHARED, fsmith@email.com)." Accordingly, the context service system provides the customer record 655 or the encrypted customer information 658 in the customer record 655 to the ACME subscriber system 610. This is represented by transmission 690 in FIG. 6.

After receiving the transmission 690, the ACME subscriber system 610 may decrypt the customer information 658 in the customer record 655 to reveal that the customer information elements of "Name: Fred Smith" and "Email: fsmith@email.com" are associated with the call 672 from the phone number 555-123-4567. In many cases, the additional information that is revealed may enable the subscriber system to provide improved services and/or additional services.

As the data sets in the context service data store increases in size and the number of subscriber data partitions grows there is an increased likelihood that multiple customer records may be identified in the subscriber data partition. According to various embodiments, the context service system may also be configured to generate scores (e.g., confidence scores) for the identified customer records and/or rank the identified customer records. The context service system may provide the subscriber system with a top ranked customer record or a set of top ranked customer records. Additionally, the context service system may provide one or more or all of the customer records to the subscriber system along with their calculated scores to allow the subscriber system to select.

According to various embodiments, the confidence score for an identified customer record may be based on the number of other subscriber systems that have identified the association between the customer record and the element of customer information and/or how recent the association between the customer record and the element of customer information was made. For example, if a large number of subscribers have identified an association between the customer record and the element of customer information, it is more likely to be an accurate identification. Accordingly, the confidence score should be higher than for a customer with fewer subscribers having identified the association.

Furthermore, associations between customer records and the element of customer information may be timestamp according to when they were created or updated. An association between a customer record and the element of customer information with a recent timestamp may be more accurate than an association with an older timestamp because the association with the recent timestamp may reflect updated information that has not reached the data partition for another subscriber. For example, a customer record may include a residential address for a user. This information may be reflected in a customer record with a particular timestamp. However, the user may have moved to a new address. This new information may be reflected in a customer record with a more recent timestamp.

Figure 7A:
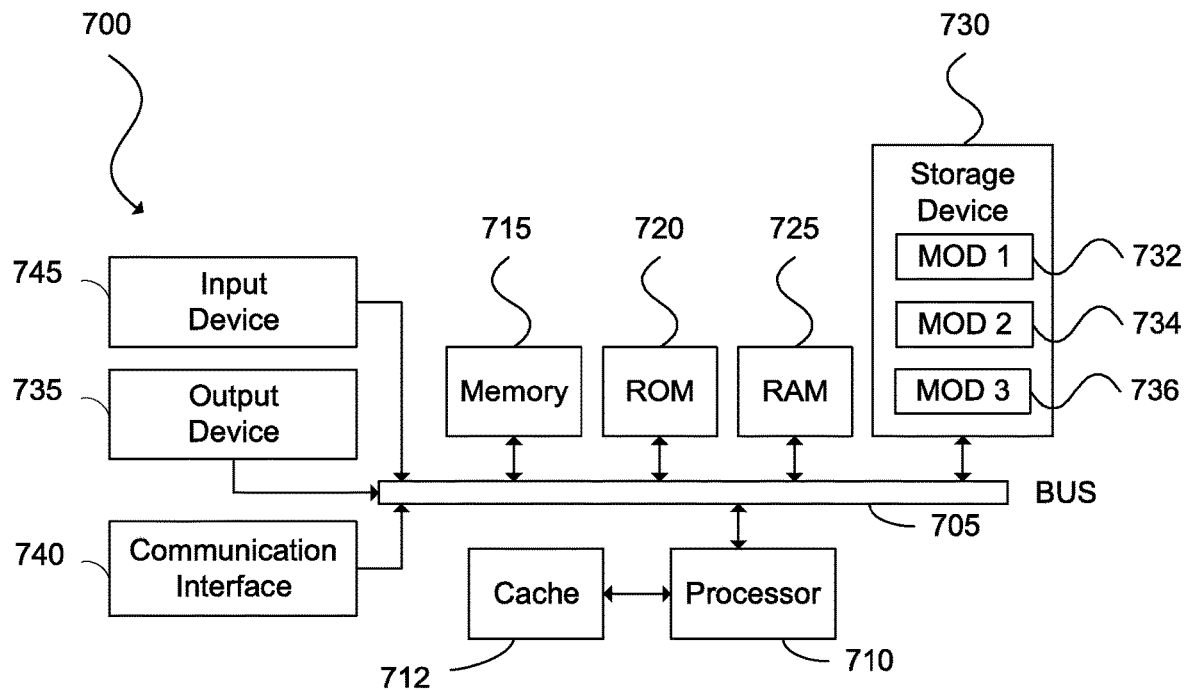
FIGS. 7A and 7B illustrate examples of systems in accordance with some embodiments.
Figure 7B:
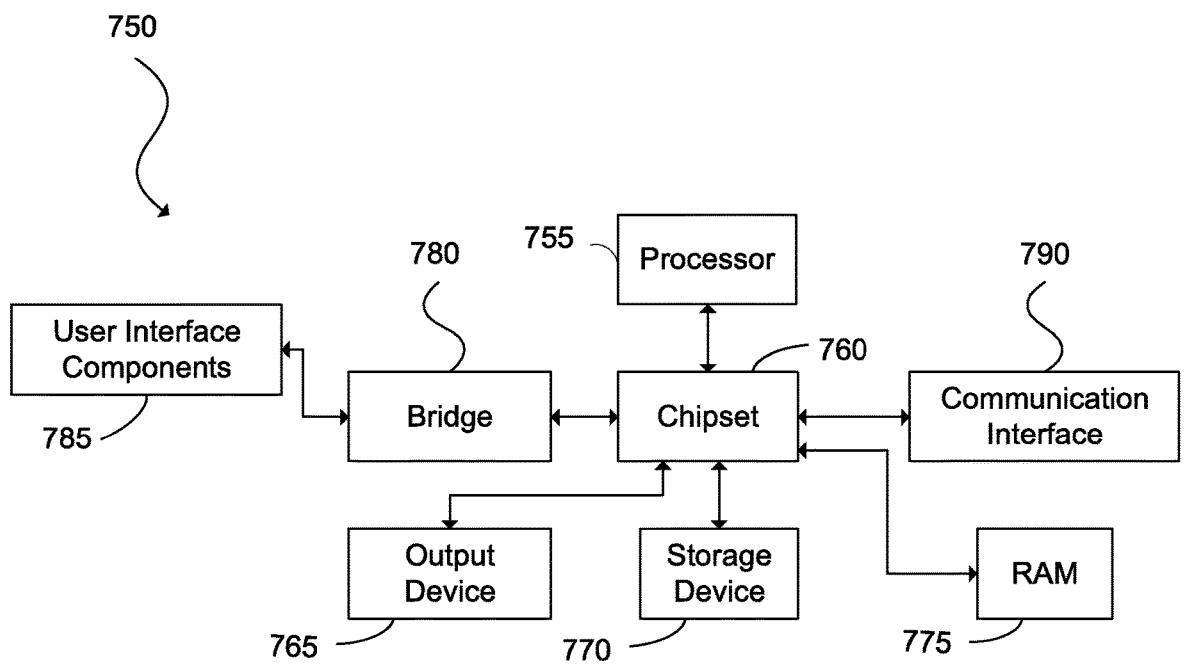

FIG. 7A and FIG. 7B illustrate systems in accordance with various embodiments. The more appropriate system will be apparent to those of ordinary skill in the art when practicing the various embodiments. Persons of ordinary skill in the art will also readily appreciate that other systems are possible.

FIG. 7A illustrates an example architecture for a bus computing system 700 wherein the components of the system are in electrical communication with each other using a bus 705. The computing system 700 can include a processing unit (CPU or processor) 710 and a system bus 705 that may couple various system components including the system memory 715, such as read only memory (ROM) in a storage device 720 and random access memory (RAM) 725, to the processor 710. The computing system 700 can include a cache 712 of high-speed memory connected directly with, in close proximity to, or integrated as part of the processor 710. The computing system 700 can copy data from the memory 715 and/or the storage device 730 to the cache 712 for quick access by the processor 710. In this way, the cache 712 can provide a performance boost that avoids processor delays while waiting for data. These and other modules can control or be configured to control the processor 710 to perform various actions. Other system memory 715 may be available for use as well. The memory 715 can include multiple different types of memory with different performance characteristics. The processor 710 can include any general purpose processor and a hardware module or software module, such as module 1 732, module 2 734, and module 3 736 stored in storage device 730, configured to control the processor 710 as well as a special-purpose processor where software instructions are incorporated into the actual processor design. The processor 710 may essentially be a completely self-contained computing system, containing multiple cores or processors, a bus, memory controller, cache, etc. A multi-core processor may be symmetric or asymmetric.

To enable user interaction with the computing system 700, an input device 745 can represent any number of input mechanisms, such as a microphone for speech, a touch-protected screen for gesture or graphical input, keyboard, mouse, motion input, speech and so forth. An output device 735 can also be one or more of a number of output mechanisms known to those of skill in the art. In some instances, multimodal systems can enable a user to provide multiple types of input to communicate with the computing system 700. The communications interface 740 can govern and manage the user input and system output. There may be no restriction on operating on any particular hardware arrangement and therefore the basic features here may easily be substituted for improved hardware or firmware arrangements as they are developed.

Storage device 730 can be a non-volatile memory and can be a hard disk or other types of computer readable media which can store data that are accessible by a computer, such as magnetic cassettes, flash memory cards, solid state memory devices, digital versatile disks, cartridges, random access memories (RAMs) 725, read only memory (ROM) 720, and hybrids thereof.

The storage device 730 can include software modules 732, 734, 736 for controlling the processor 710. Other hardware or software modules are contemplated. The storage device 730 can be connected to the system bus 705. In one aspect, a hardware module that performs a particular function can include the software component stored in a computer-readable medium in connection with the necessary hardware components, such as the processor 710, bus 705, output device 735, and so forth, to carry out the function.

FIG. 7B illustrates an example architecture for a chipset computing system 750 that can be used in accordance with an embodiment. The computing system 750 can include a processor 755, representative of any number of physically and/or logically distinct resources capable of executing software, firmware, and hardware configured to perform identified computations. The processor 755 can communicate with a chipset 760 that can control input to and output from the processor 755. In this example, the chipset 760 can output information to an output device 765, such as a display, and can read and write information to storage device 770, which can include magnetic media, and solid state media, for example. The chipset 760 can also read data from and write data to RAM 775. A bridge 780 for interfacing with a variety of user interface components 785 can be provided for interfacing with the chipset 760. The user interface components 785 can include a keyboard, a microphone, touch detection and processing circuitry, a pointing device, such as a mouse, and so on. Inputs to the computing system 750 can come from any of a variety of sources, machine generated and/or human generated.

The chipset 760 can also interface with one or more communication interfaces 790 that can have different physical interfaces. The communication interfaces 790 can include interfaces for wired and wireless LANs, for broadband wireless networks, as well as personal area networks. Some applications of the methods for generating, displaying, and using the GUI disclosed herein can include receiving ordered datasets over the physical interface or be generated by the machine itself by processor 755 analyzing data stored in the storage device 770 or the RAM 775. Further, the computing system 700 can receive inputs from a user via the user interface components 785 and execute appropriate functions, such as browsing functions by interpreting these inputs using the processor 755.

It will be appreciated that computing systems 700 and 750 can have more than one processor 710 and 755, respectively, or be part of a group or cluster of computing devices networked together to provide greater processing capability.

For clarity of explanation, in some instances the various embodiments may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware, and/or software, and can take any of a variety of form factors. Examples of such form factors include laptops, smart phones, small form factor personal computers, personal digital assistants, rack-mount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The invention claimed is:

1. A computer-implemented method comprising:
receiving, from a subscriber system, a shared customer lookup request that includes a first customer data identifier;
identifying, in a shared data partition, a second customer data identifier associated with the first customer data identifier; and
wherein the first customer data identifier is a first hashed value based on a shared salt value and a first element of customer information received by the subscriber system, and wherein the second customer data identifier is a second hashed value based on the shared salt value and a second element of customer information;
determining that the second customer data identifier is associated with a customer record in a subscriber data partition; and
providing to the subscriber system, in response to the second customer data identifier being associated with the customer record, customer information in the customer record from the subscriber data partition;
calculating a confidence score for the customer record based on a timestamp associated with the customer record; and
providing the confidence score to the subscriber system.

2. The computer-implemented method of claim 1, wherein the customer information is encrypted.

3. The computer-implemented method of claim 1, wherein the first customer data identifier is an element of customer information received by the subscriber system.

4. The computer-implemented method of claim 1, further comprising identifying a match between the second customer data identifier and a third customer data identifier associated with the customer record in the subscriber data partition.

5. The computer-implemented method of claim 1, further comprising:

receiving, from the subscriber system, a subscriber customer lookup request that includes a fourth customer data identifier;

determining whether the fourth customer data identifier is associated with a second customer record in the subscriber data partition; and providing, to the subscriber system, second customer information in the second customer record from the subscriber data partition when the fourth customer data identifier is associated with the second customer record in the subscriber data partition.

6. The computer-implemented method of claim 5, wherein the fourth customer data identifier is a hashed value based on a subscriber salt value and an element of customer information received by the subscriber system.

7. The computer-implemented method of claim 1, wherein the first customer data identifier is based on one of a user name, a phone number, an email address, or an address.

8. The computer-implemented method of claim 1, wherein the subscriber data partition is associated with the subscriber system.

9. A non-transitory computer-readable medium comprising instructions, the instructions, when executed by a computing system, cause the computing system to:

receive, from a subscriber, a shared customer lookup request that includes a first customer data identifier;

identify, in a shared data partition, a second customer data identifier associated with the first customer data identifier; and wherein the first customer data identifier is a first hashed value based on a shared salt value and a first element of customer information received by the subscriber, and wherein the second customer data identifier is a second hashed value based on the shared salt value and a second element of customer information;

determine that the second customer data identifier is associated with customer information in a subscriber data partition; and transmit, to the subscriber, the customer information from the subscriber data partition;

calculating a confidence score for the customer record based on a timestamp associated with the customer record; and providing the confidence score to the subscriber system.

10. The non-transitory computer-readable medium of claim 9, wherein the first customer data identifier is an element of customer information received by the subscriber.

11. The non-transitory computer-readable medium of claim 9, wherein the instructions further cause the computing system to identify a match between the second customer data identifier and a third customer data identifier associated with the customer information in the subscriber data partition.

12. A system comprising:

a processor;

a subscriber data partition comprising customer records associated with a subscriber;

a shared data partition comprising customer records associated with a set of subscribers; and a non-transitory computer-readable medium storing instructions that, when executed by the system, cause the system to:

receive, from the subscriber, a shared customer lookup request that includes a first customer data identifier;

identify, in the shared data partition, a second customer data identifier associated with the first customer data identifier; and wherein the first customer data identifier is a first hashed value based on a shared salt value and a first element of customer information received by the subscriber, and wherein the second customer data identifier is a second hashed value based on the shared salt value and a second element of customer information;

determine that the second customer data identifier is associated with customer information in the subscriber data partition; and transmit, to the subscriber, the customer information from the subscriber data partition;

calculating a confidence score for the customer record based on a timestamp associated with the customer record; and providing the confidence score to the subscriber system.

13. The system of claim 12, wherein the subscriber is a member of the set of subscribers.

14. The system of claim 12, wherein the customer information is encrypted.

15. The system of claim 12, wherein the first customer data identifier is an element of customer information received by the subscriber.

16. The system of claim 12, wherein the instructions further cause the system to identify a match between the second customer data identifier and a third customer data identifier associated with the customer information in the subscriber data partition.

\* \* \* \* \*